United States Patent [19]

Roberts et al.

[11] Patent Number: 5,062,323
[45] Date of Patent: Nov. 5, 1991

[54] TIRE REPAIR PLUG AND INSTALLATION TOOL

[75] Inventors: Simon Roberts, Southfield; John A. Battista, Livonia; Alex Rhodes, West Bloomfield, all of Mich.

[73] Assignee: Baseline Products, Inc., Southfield, Mich.

[21] Appl. No.: 387,972

[22] Filed: Jul. 31, 1989

[51] Int. Cl.⁵ .................. B29C 73/08; B29C 73/06
[52] U.S. Cl. .................................. 81/15.7; 81/15.2; 152/370
[58] Field of Search .............. 152/367, 370; 81/15.2, 81/15.5, 15.6, 15.7; 156/94, 97; 206/582; 138/97, 98

[56] References Cited

U.S. PATENT DOCUMENTS

| | | | |
|---|---|---|---|
| 2,095,931 | 10/1937 | Kraft | 152/370 |
| 3,083,597 | 4/1963 | Best | 152/370 |
| 3,383,960 | 5/1968 | Block | 152/370 |
| 4,579,161 | 4/1986 | Roberts | 81/15.7 X |
| 4,802,388 | 2/1989 | Roberts | 156/97 X |

Primary Examiner—Michael W. Ball
Assistant Examiner—Gregory J. Wilbur
Attorney, Agent, or Firm—Alex Rhodes

[57] ABSTRACT

A plug and installation tool for repairing punctures in vehicle tires mounted on motor vehicles. The plug is a generally cylindrical part made of a rubber material with enlarged end portions and an interconnecting cylindrical shank portion. One of the enlarged end portions is a cylindrical head portion and has a circumferential groove for engaging the insertion tool. The other end portion is a spherical tail portion. In the first aspect of the invention an assembly comprised of the plug and a rigid core disposed on the axis of the plug is mounted on the installation tool, elongated by the tool and inserted in a puncture. In the second aspect of the invention, the rigid core is installed in the plug after the plug is inserted into the puncture. When the plug is installed in a puncture it has a generally "hourglass" shape with sealing surfaces in the puncture and at the inner and outer ends of the puncture. The installation tool is an assembly of a frame and a plunger which slideably engages the frame to elongate and reduce its diameter.

11 Claims, 2 Drawing Sheets

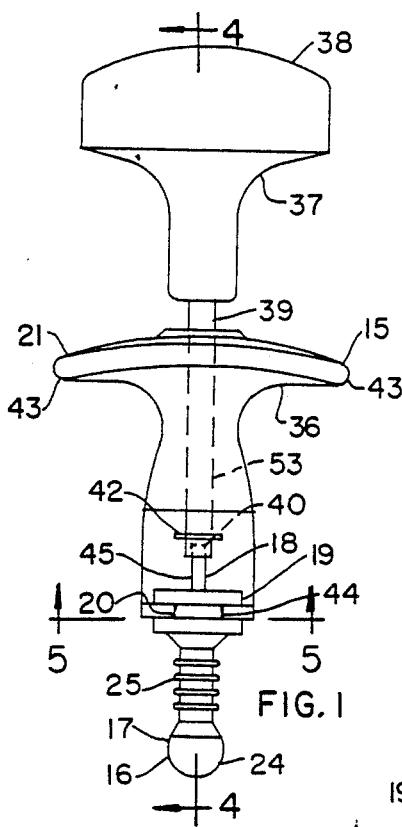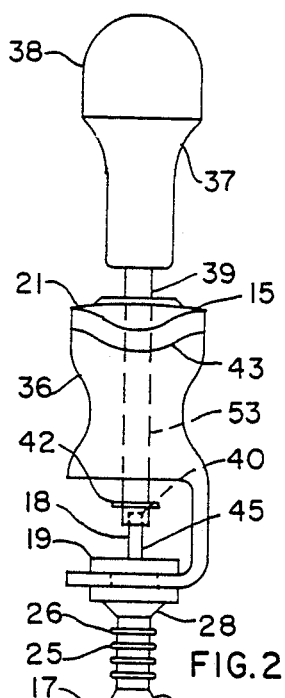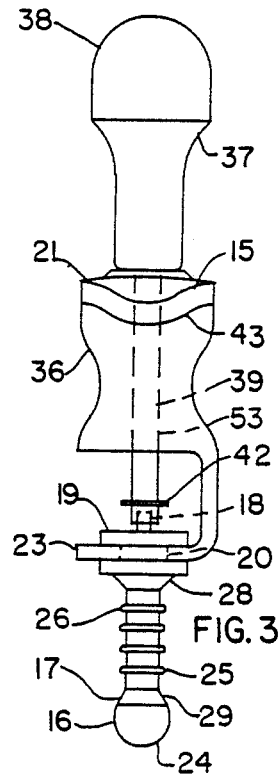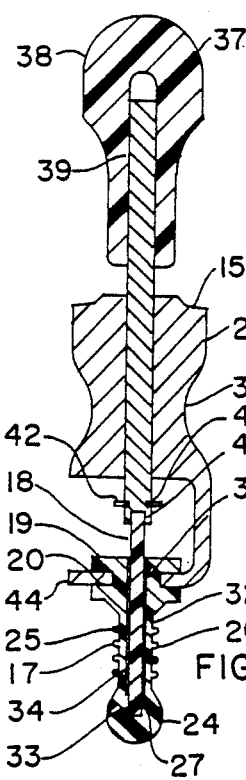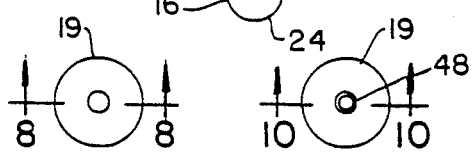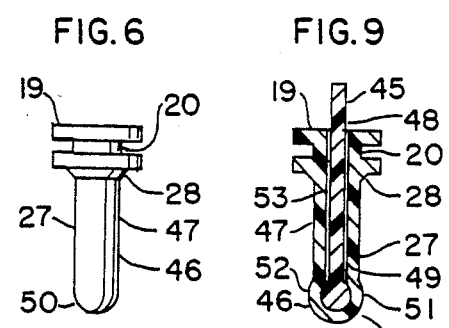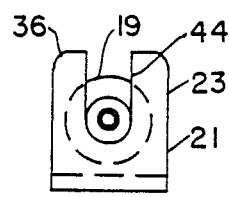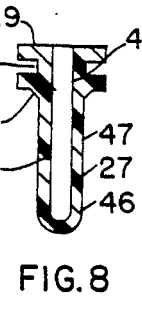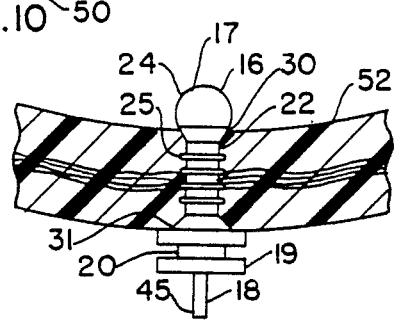

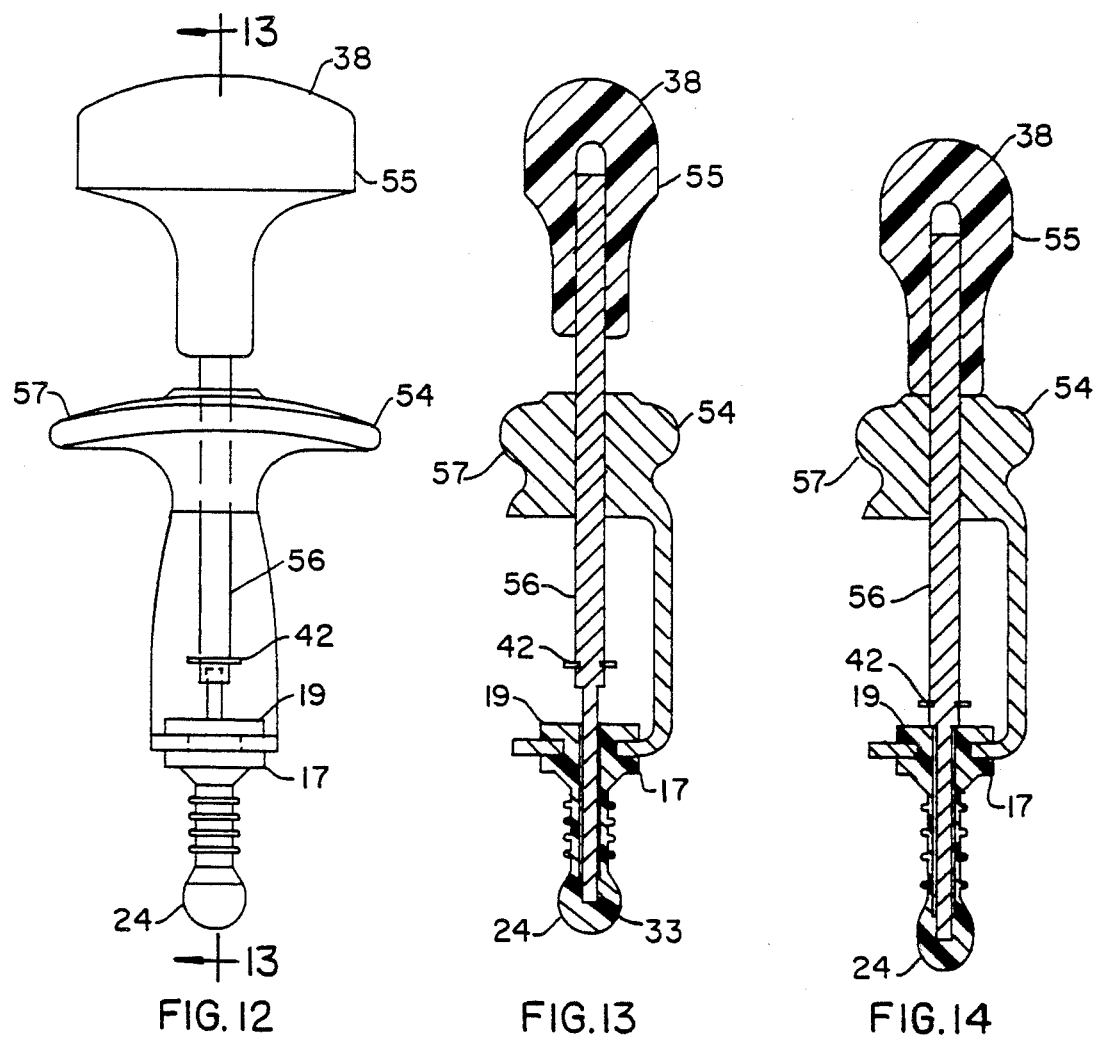

TIRE REPAIR PLUG AND INSTALLATION TOOL

BACKGROUND OF THE INVENTION

This invention relates to tire repair more particularly to a tire repair plug and installation tool for repairing punctures in vehicle tires.

One problem in the prior art is that punctured tires are deemed unreliable and often discarded or after repair used as spares. This practice is wasteful and has added to the cost of ownership of motor vehicles. Another problem is that mounting spare tires on the road is difficult, dirty and often dangerous.

Roberts U.S. Pat. No. 4,579,161 discloses a headless plug and tool for repairing a punctured tire mounted on a vehicle. The plug is forcibly inserted into a puncture by a rod-shaped tool which engages an aperture on the axis of the plug. After the plug has been installed, the tool is withdrawn and a cylindrical core is installed in the aperture.

Several problems were encountered during attempts to apply Roberts U.S. Pat. No. 4,579,161. One problem was that withdrawal of the installation tool from the plug caused partial withdrawal of the plug from the puncture. This problem was due to the radial compression of the plug causing the plug to tightly grip the tool.

Another problem was that the forcible insertion of the core into the plug tended to push the plug into the tire.

Another problem was that the plug was not effective in all cases for sealing puctures, particularly in thin sections of a tire, by way of example, tread grooves, sidewalls and excessively worn treads.

SUMMARY OF THE INVENTION

The present invention overcomes the problems of Roberts U.S. Pat. No. 4,579,161 and provides further benefits. In the first aspect of the invention a pre-assembly of a plug and core is provided for installation in a puncture. In the second aspect of the invention, the core is inserted into a plug after the plug has been installed in a puncture. In both aspects, an improved installation tool is used which elongates the plug and reduces its diameter. The installation tool, which in itself is believed to be novel, reduces insertion efforts and permits the use of a common plug for a range of tire thicknesses.

The plug is a generally cylindrical part made of a rubber-like material with enlarged end portions and an interconnecting cylindrical shank portion. One of the enlarged end portions is a cylindrical head portion and has a circumferential groove for engaging the insertion tool. The other end portion is a spherical tail portion. The junctures of the cylindrical head and spherical tail portions and the shank portion are tapered and serve as seals for the inner and outer ends of the puncture.

On the outer surface of the shank portion are circumferential sealing rings. In the center of the plug there is a stepped axial aperture which is reduced in diameter at the inner end. The stepped aperture is an important feature of the invention. As will be understood from the detailed description of the preferred embodiment, the stepped aperture reduces insertion efforts and eliminates the problem of plug withdrawal during disengagement of the installation tool.

In the first aspect of the invention, the slender core which is pre-assembled into the plug snugly engages the aperture at the reduced inner end. The opposite end of the core protrudes from the head portion of the plug. Surrounding the remaining portion of the core there is a liberal clearance space.

The insertion tool is an assembly of a frame and a plunger which slideably engages the frame. At one end of the frame there is a slotted foot which is adapted to engage the groove in the head of the plug. At the other end of the frame there is an aperture which slideably receives the plunger and a pair of lateral outwardly extending arms for grasping the frame with the index and forefingers of the user's hand.

The plunger is comprised of a knob which conforms to the palm of the user's hand and an attached slender cylindrical shaft which slideably engages the frame. In the first aspect of the invention, at the end of the shaft opposite the knob there is a shallow recess for engaging the end portion of the core which protrudes from the plug.

In the second aspect of the invention, the end of the plunger shaft snugly engages the aperture at the reduced inner end. There is a liberal clearance space surrounding the other portion of the plunger shaft which is inside of the aperture.

In both aspects of the invention, the plug is installed by mounting the plug on the tool, coating the plug with an adhesive, elongating the plug and pushing the plug into the puncture. The elongation of the plug reduces the insertion force by reducing the plug diameter and compensates for differences in tire thickness. When the insertion tool is removed from the plug, the plug contracts, causing the diameter of the shank to expand and the tapered portions to seat in the ends of the puncture.

The foregoing features and benefits, together with additional features and benefits will be more apparent from the ensuing detailed description, accompanying drawings and manner of using the invention.

BRIEF DESCRIPTION OF THE DRAWINGS

FIG. 1 is a front view of a repair plug and core assembly and an insertion tool which embody the present invention.

FIG. 2 is a left side view of FIG. 1.

FIG. 3 is a left side view of the same apparatus as FIG. 1 showing the appearance of the insertion tool, plug and core when the plug is elongated.

FIG. 4 is a cross sectional view taken on the line 4—4 in FIG. 1.

FIG. 5 is a cross sectional view taken on the line 5—5 in FIG. 1.

FIG. 6 is a plan view of an alternate embodiment of the plug.

FIG. 7 is a front view of the alternate embodiment shown in FIG. 6.

FIG. 8 is a cross sectional view taken on the line 8—8 of FIG. 6.

FIG. 9 is a plan view of an assembly of the plug of FIG. 6 and a core in the aperture of the plug.

FIG. 10 is a cross sectional view taken on the line 10—10 in FIG. 9.

FIG. 11 is a partial cross-sectional view of a punctured tire with the repair plug and core assembly installed in a puncture.

FIG. 12 is a front view of an alternate embodiment of a plug and tool.

FIG. 13 is a cross sectional view taken on the line 12—12 in FIG. 12.

FIG. 14 is a cross sectional view similar to FIG. 13 showing the appearance of the insertion tool and plug when the plug is elongated.

DETAILED DESCRIPTION OF THE PREFERRED EMBODIMENT

Referring no to the drawings wherein like numerals designate like and corresponding parts throughout the several views, the invention 15 comprises an assembly 16 of a generally cylindrical plug 17 and a slender cylindrical core 18 in combination with an installation tool 21 for forcibly inserting the plug 17 into a puncture 22. The invention can be best understood by referring to FIGS. 1 and 2, showing the plug 17 mounted on the tool 21.

The plug 17 is made from a rubber-like material and has a rigid or semi-rigid slender cylindrical core 18 protruding from one end of the plug 17. The end portion of the plug 17 where the core 18 protrudes is an enlarged cylindrical head 19 and has a circumferential groove 20 for engaging the slotted foot 23 of the installation tool 21. The other end of the plug 17 is an enlarged spherical tail portion 24. The enlarged spherical tail portion 24 is an important feature which has been found to substantially contribute to the sealing of a puncture 22.

Between the cylindrical head 19 and spherical tail 24 there is a cylindrical shank 25 which may include the type of integral sealing rings 26 disclosed in Roberts U.S. Pat. No. 4,579,161 as shown in FIGS. 1 through 5 or there may be a smooth shank 27 as shown in FIGS. 5 through 10. The portion 28 where the cylindrical head 19 joins the cylindrical shank 25 and the portion 29 where the spherical tail 24 joins the shank 25 are preferably tapered to augment the sealing of the inner end 30 and outer end 31 of a puncture 22. In the center of the plug 17 there is a stepped blind aperture 32 which is open at the cylindrical head 19 and extends along the plug axis to a short distance from the other end of the plug 17. As shown in FIGS. 4, the diameter of the aperture 27 at the inner end 33 is reduced for a short distance to retain the core 18 in the plug 17 prior to the installation of the assembly 16 in a puncture. A clearance space 34 is provided between the aperture 32 and remaining portion 35 of the core 18.

The clearance space between the core 18 and plug's aperture 32 is important to avoid excessive efforts when elongating the plug 17 with the tool 21. With reference to FIG. 3, it will be observed that when the plug 17 is elongated with the tool 21, the diameters of the shank 25 and the aperture 32 are decreased. If the clearance betweeen the core 18 and the aperture 32 is insufficient, the plug will grip the core and increase the effort to push the core 18 into the plug 17.

Another benefit of the radial clearance space 34 is reduced effort for assembling the core 18 to the plug 17. Still yet another benefit is increased radial compliance for accommodating variations in puncture 22 size and shape. Referring now to FIGS. 6–10, it will be appreciated that a straight aperture 49 and a rod 45 with an enlarged end 52 can be used in lieu of the stepped aperture 32.

One benefit of the core and plug assembly 16 is that the core 18 cannot be inadvertently omitted by a user. Another benefit is that the problem of withdrawal of the plug 17 during disengagement of the tool from the plug has been eliminated.

The installation tool 21 is an assembly of a frame 36 and a plunger 37. The tool 21 serves three purposes, namely: 1) to reduce the effort of inserting the plug 17 int o the puncture 22 by reducing the plug's diameter, 2) to install the plug 17 into the puncture 22, and 3) to compensate for differences in tire thickness by elongating the plug 17.

The plunger 37 is comprised of a knob 38 and a slender cylindrical shaft 39 suitably attached to the knob 38. At the end of the shaft 39 opposite the knob 38, there is a recess 40 which supports the end of the core 18, during the elongation of the plug 17 with the tool 21, a groove 41 and a ring 42 for retaining the plunger 37 in the frame 36.

Opposite the foot 23 of the frame 36 there is a pair of outward projecting arms 43. The arms 43 are shaped to conform to the fingers of the user's hand. The foot 23 has an open slot 44 which engages the circular groove 20 in the head 19 of the plug 17. In the center of the frame 36 there is an aperture 53 which slideably receives the plunger shaft 39.

The invention 15 is used in the following manner. For best results, alternate size plug and rod assemblies 16 are desirable to accommodate differences in puncture 22 size. The puncture 22 is preferably determined with a gauge (not shown), such as the gauge disclosed in Roberts U.S. Pat. No. 4,579,161, incorporated herein by reference, or by sizing the puncture with a rasp type tool (not shown). An appropriate plug 17 is selected and the tool 21 is positioned in the palm of the user's hand with the fingers gripping the outward extending arms 43 and the knob 38 resting on the palm. The plunger 37 is retracted and the plug and rod assembly 16 mounted on the tool 21 by engaging the groove 20 of the plug 17 with the slot 44 of the tool 21. The plunger 37 is advanced to engage the recess 40 in the end of the plunger shaft with the protruding end 45 of the core 18 and an adhesive is applied to the plug 17 by brushing or dipping.

The plunger 37 is advanced into the frame 36 to elongate the plug 17 and the plug 17 is forcibly inserted into the puncture 22. The tool 21 is disengaged from the plug 17 and core 18 and the protruding portions of the plug 17 and core 18 are removed with a conventional cutter (not shown) such as a pair of cutting pliers. With reference to FIG. 11, it will be observed that when the plug and rod assembly 16 is installed in a puncture 22 the plug 17 has a generally "hourglass" shape with enlarged end portions 19, 24 and a reduced intermediate portion 25. It will be further observed that the air pressure inside of the tire will act to force the spherical tail portion 24 into the inner end 30 of the puncture 22.

In FIGS. 5 through 10, an alternate embodiment 46 is disclosed wherein the spherical tail portion 50 of the plug 47 as molded is not enlarged. The plug is a generally cylindrical body with an enlarged cylindrical head 19 and a spherical tail portion 50. A core 48 with an enlarged spherical end 52 is provided which, when installed in the aperture 53 of the plug 47, causes an enlargement of the spherical tail 50. One benefit of this embodiment 46 is that plug and pin assemblies 51 comprised of a common plug 47 and alternate cores 48 with different spherical ends 52 can be used for sealing a range of puncture 22 sizes.

With reference to FIGS. 12–14, in the alternate embodiment 54 shown therein, the same plug 17 as the embodiment of FIGS. 1–5 is used with an insertion tool 55 having a longer plunger shaft 56, and a longer frame 57 for receiving the shaft 56 the extra length of the shaft 56 serves the same purpose as the core 18 in the embodiment shown in FIG. 4 for inserting the plug 17 into aperture 32. When the plug 17 is mounted on the end of the plunger shaft 56, the plunger shaft 56 is advanced into the plug aperture 32 and the end of the shaft 56 is snugly engaged with the reduced diameter end portion 33 of the aperture 32. An adhesive is applied, the plug is elongated and installed into the puncture 22 without the core 18. The tool 55 is disengaged, the slender cylindrical core 18 is permanently installed in the aperture of the plug 17 and the excess portions of the plug 17 and core 18, shown in FIG. 11 are removed with a conventional cutting tool (not shown).

While the present invention has been described in conjunction with several specific embodiments, it is evident that many alternatives, modifications, and variations by mere substitutions or changes in material, shape, number and arrangement of parts, will be apparent to those skilled in the art in light of the foregoing description. Accordingly, it is intended to embrace all such alternatives, modifications, and variations as may fall within the spirit and broad scope of the claims which are appended hereto.

We claim:

1. A plug and tool for repairing a puncture of a vehicle tire comprising: an assembly of a generally cylindrical plug made of a rubber material, a cylindrical shank portion having a circular aperture disposed on the axis of said plug and an enlarged cylindrical head end portion adjoining said shank portion which is adapted for engaging a tool to insert the plug into a puncture and a slender cylindrical core for engaging said aperture, one end portion of said core projecting outwardly from said plug for engaging the end of a shank of a tool; and a tool for elongating and inserting said plug into a puncture of a tire, said tool having a frame with a slotted foot portion for releaseably engaging said enlarged head portion of said plug and a shank slideably mounted in said frame, said shank having an end portion for releaseably engaging said outward projecting end of said core.

2. The plug and tool recited in claim 1 further comprising said plug having an enlarged spherical tail portion adjoining said shank portion.

3. The plug and tool recited in claim 2 further comprising said plug having a tapered portion for joining together said spherical tail and said cylindrical shank portions.

4. The plug and tool recited in claim 1 further comprising said plug having a tapered portion for joining together said enlarged cylindrical head and said cylindrical shank portions.

5. The plug and tool recited in claim 1 further comprising said aperture having a reduced diameter inner end portion.

6. The plug and tool recited in claim 1 further comprising said core having an enlarged spherical end portion.

7. The plug and tool recited in claim 1 further comprising a plurality of circular concentric sealing rings on said cylindrical shank portion.

8. The plug and tool recited in claim 1 further comprising a circular groove extending around the periphery of the cylindrical head and centered about the axis of said plug for engaging said tool.

9. The plug and tool recited in claim 1 wherein said tool comprises a frame, said frame having an aperture for slideably receiving a plunger, said slotted foot for engaging said cylindrical head of said plug, and a pair of outward extending arms for grasping with the fingers of a user's hand; and said plunger, said plunger having a knob and a slender shaft joined to said knob in said slideable engagement with said aperture of said frame.

10. A plug and tool for repairing a puncture of a vehicle tire comprising: an assembly of a generally cylindrical plug made of a rubber material having a circular aperture aligned with the axis of said plug, an enlarged cylindrical head end portion which is adapted to engage a tool for inserting the plug into a puncture, an enlarged opposite spherical tail portion and a cylindrical intermediate portion adjoining said head and spherical tail portions, and a cylindrical slender core engaging said aperture, one end portion of said core projecting out of the cylindrical head portion of said plug; and a tool, said tool comprising a frame, said frame having an aperture for slideably receiving a plunger, a slotted foot for releaseably engaging said cylindrical head of said plug, and a pair of outward extending arms for grasping with the fingers of a user's hand; and a plunger, said plunger having a knob and a slender shaft joined to said knob in slideable engagement with said aperture of said frame for releaseably engaging said outwardly projecting core portion.

11. A plug and tool for repairing a puncture of a vehicle tire comprising: an assembly of a generally cylindrical plug made of a rubber material having a circular aperture aligned with the axis of said plug, an enlarged cylindrical head end portion which is adapted for engaging a tool to insert the plug into a puncture, an enlarged opposite spherical tail portion and a cylindrical intermediate portion adjoining said head and spherical tail portions, said intermediate portion having a plurality of concentric circular rings for sealing said puncture and a cylindrical slender core engaging said aperture, one end portion of said core projecting out of the cylindrical head portion of said plug; and a tool, said tool comprising a frame, said frame having an aperture for slideably receiving a plunger, a slotted foot for releaseably engaging said cylindrical head of said plug, and a pair of outward extending arms for grasping with the fingers of a user's hand; and a plunger, said plunger having a knob and a slender shaft joined to said knob in slideable engagement with said aperture of said frame for releaseably engaging said outwardly projecting end of said core.

* * * * *